Jan. 12, 1965   C. H. ALLEN   3,164,916

DATING MEANS FOR ELECTRIC STORAGE BATTERIES

Filed May 25, 1962

INVENTOR
*Charles H. Allen*

BY *Mason, Fenwick & Lawrence*
ATTORNEYS

United States Patent Office 3,164,916
Patented Jan. 12, 1965

---

3,164,916
DATING MEANS FOR ELECTRIC STORAGE BATTERIES
Charles H. Allen, Dallas, Tex., assignor to Vitalic Battery Co., Inc., Dallas, Tex., a corporation of New York
Filed May 25, 1962, Ser. No. 197,773
5 Claims. (Cl. 40—2.2)

This invention relates to electric storage batteries, and more particularly to an improved means for permanently recording on a battery certain dates corresponding to the date of manufacture, the date of shipment, the date of retail sale, and the like.

The performance and length of service of most electric storage batteries is attributable to many factors, including certain defects occurring during the original manufacturing process, improper usage and maintenance of the battery in service and the normal deterioration of the cells due to the normal chemical reactions which occur in the cells. In the electric storage battery industry it has become a common practice for manufacturers to provide certain warranties against original defect and also for a specified period of satisfactory service. In connection with the administration of these warranties, it further has been the practice of manufacturers to keep some permanent record on each battery with respect to certain significant dates as the date of manufacture, the date of shipment and the date of retail sale to the ultimate consumer, in order to establish the date of commencement of the various applicable warranties.

In the past, various means have been employed by manufacturers for recording dates on batteries. In older type batteries this information was imprinted on the connectors, but with the newer type batteries, the connectors are covered with a sealing compound. This has necessitated either imprinting the information with a branding iron on the outside of the battery case, or manually stamping the date on the lead washer around the terminal posts. Both of these methods have proven unsatisfactory, in that they result in a defacing of the battery which affects the appearance of the casing, an illegible imprint where the blow on the imprint tool is too soft, or serious damage to the casing where the blow on the imprint tool is too hard.

Additionally, some manufacturers of batteries have been known to apply pressure sensitive labels, or otherwise cement labels, on the exterior of the battery cases or covers which are stamped or marked to indicate the date the battery was manufactured and perhaps shipped from the manufacturing plant. Such methods of showing battery date codes have the disadvantage of becoming smudged with grease or oil, or being attacked by an acid, making them illegible after a short period in normal service. Also, it has been found that such labels frequently come loose or may be purposely removed from the battery case or cover, which makes it impossible for the age of the battery to be determined when a warranty adjustment is desired.

It is, therefore, the general object of this invention to provide an improved means for permanently recording certain information on electric storage batteries.

Another object of this invention is to provide an improved means for permanently recording on electric storage batteries such information relating to the date of manufacture, the date of shipment from the manufacturing plant, the date of retail sale, and the like.

A further object of this invention is to provide an improved means for an electric storage battery for permanently recording certain information thereon relating to the age of the battery which is formed integral with the casing thereof.

A still further object of this invention is to provide an identification means for an electric storage battery for recording certain information thereof relating to selected significant dates, which assures against alteration by persons intending to defraud manufacturers and retailers with respect to the ascertainment of the date of commencement of warranty periods.

Other objects and advantages of the present invention will become apparent to those skilled in the art, from the following description when read in conjunction with the accompanying drawing, wherein.

Briefly, the present invention is concerned with a dating means for electric storage batteries of the type having a hard rubber casing and a plurality of vents, each provided with a raised vent cap, comprising a plurality of defaceable raised or embossed indicia formed integral with the casing and disposed adjacent to one or more of the vent caps. Different sets of indicia are provided which correspond to the first letter of the month and the last numeral of the year. To make a permanent recording of a particular date on the battery, a tool such as a screwdriver is inserted against a selected indicia, between the indicia and the vent cap, and by utilizing the vent cap as a fulcrum the selected indicia can easily be snapped off.

Figure 1:
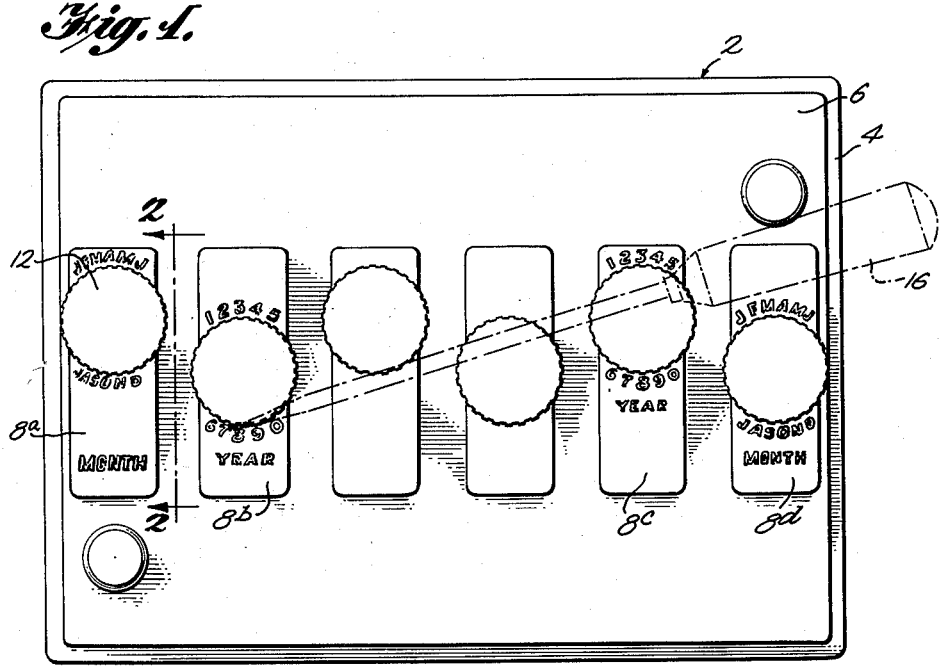
FIGURE 1 is a top plan view of an electric storage battery provided with the novel means for recording information of the present invention, showing a screwdriver in broken lines which is provided to illustrate the method of recording information thereon.
Figure 2:
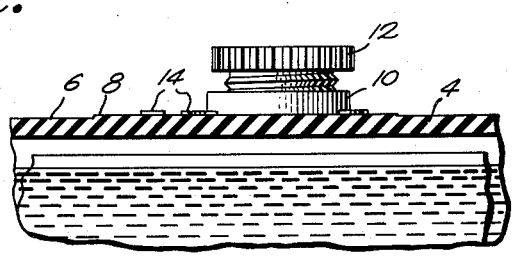
FIGURE 2 is a sectional view taken along lines 2—2 of FIGURE 1.

Referring to FIGURE 1, there is shown an electric storage battery 2 having a substantially rectangular hard rubber casing 4. Disposed on the top surface 6 is a plurality of hard rubber cover plates 8 formed integral with the casing 4, each of which correspond to a separate battery cell. Each of the hard rubber cover plates 8 is provided with an opening defining a vent having an internally threaded collar 10 for receiving a vent cap 12. Disposed on the cover plates 8 adjacent one or more vent caps and preferably above and below, as shown in FIGURE 1, is a plurality of raised indicia 14. The indicia on cover plates 8a and 8d correspond to the first letter of the month of the year and the indicia on cover plates 8b and 8c correspond to the last numeral of the year of the date to be recorded.

The indicia can be affixed to the hard rubber cover plates 8 adjacent the vent caps 12 by any suitable means which would permit them to be readily defaced in a manner hereinafter to be described. It is preferred, however, that they be molded integral with the battery casing. The particular disposition of the indicia and the types of indicia can vary according to the type of information to be recorded on the battery casing. It is contemplated that certain of the plates, such as cover plates 8a and 8d, be provided with embossed indicia corresponding to the first letter of the month and that other adjacent cover plates 8b and 8c be provided with indicia corresponding to the numerals 1 through 10. Additionally, it is preferred that each of the indicia have the same height and be equally spaced from the circumference of the vent caps.

When a battery manufacturer is ready to ship a battery to a retail dealer, he can utilize the indicia on cover plates 8a and 8b to record the date of shipment. This is accomplished by the simple operation of inserting a tool such as a screwdriver 16 against a selected indicium such as numeral 8 on plate 8b, as illustrated in FIGURE 1 and by utilizing the vent cap 12 as a fulcrum, the indicum can be snapped off. It can thus be seen that the letter corresponding to the month on plate 8a and the numeral corresponding to the year on cover plate 8b can be snapped off to provide a permanent record of the date of shipment by the manufacturer. Similarly, the date of retail sale can be indicated on cover plates 8c and 8d by the retail dealer to record the date of sale, thus establishing the initial date of the warranty period.

From the foregoing detailed description, it will be evident that there are a number of changes, adaptations, and modifications of the present invention which come within the province of those skilled in the art. However, it is intended that all such variations not departing from the spirit of the invention, be considered as within the scope thereof as limited solely by the appended claims.

What I claim is:

1. In a storage battery of the type having a casing and a plurality of raised vent caps, an identification means comprising defaceable raised indicia formed integral with the casing and disposed sufficiently adjacent to at least one of the vent caps to permit an instrument to be inserted between a selected indicium and said vent cap whereby the selected indicium may be snapped off, utilizing said vent cap as a fulcrum.

2. In a storage battery of the type having a hard rubber casing and a plurality of raised vent caps, an identification means comprising defaceable raised indicia molded integral with the casing and disposed sufficiently adjacent to at least one of the vent caps to permit an instrument to be inserted between a selected indicium and said vent cap whereby the selected indicium may be snapped off, utilizing the adjacent vent cap as a fulcrum.

3. In a storage battery of the type having a hard rubber casing and a plurality of raised vent caps, an identification means comprising a plurality of defaceable raised indicia formed integral with the casing and disposed sufficiently adjacent to at least one of the vent caps to permit an instrument to be inserted between a selected indicium and said vent cap whereby the selected indicium may be snapped off, utilizing the adjacent vent cap as a fulcrum, and each of the indicia being spaced equally from the circumference of the adjacent vent cap.

4. In a storage battery of the type having a hard rubber casing and a plurality of raised vent caps, an identification means comprising two groups of defaceable raised indicia formed integral with the casing and disposed sufficiently adjacent at least one vent cap to permit an instrument to be inserted between a selected indicium and said vent cap whereby the selected indicium may be snapped off, utilizing said vent cap as a fulcrum, each of the indicia of each group being equally circumferentially spaced relative to each other and being spaced equally from the circumference of the adjacent vent cap.

5. In a storage battery of the type having a hard rubber casing and a plurality of raised vent caps, an identification means comprising a plurality of defaceable raised indicia formed integral with the casing and disposed sufficiently adjacent to at least two of the vent caps to permit an instrument to be inserted between a selected indicium and said vent cap whereby the selected indicium may be snapped off, utilizing said vent cap as a fulcrum, the indicia adjacent one of the vent caps corresponding to the first letter in each of the months of the year, and the indicia adjacent at least another vent cap corresponding to the numerals 1 through 10, and each of the indicia being spaced equally from the circumference of the adjacent vent cap.

References Cited by the Examiner

UNITED STATES PATENTS

| | | | |
|---|---|---|---|
| 1,992,779 | 2/35 | Shedd | 40—2.2 |
| 2,001,679 | 5/35 | Haughey | 40—306 |
| 2,061,649 | 11/36 | Campbell | 40—2 |
| 2,201,524 | 5/40 | Esty | 40—307 |

JEROME SCHNALL, *Primary Examiner.*

L. J. LENNY, *Examiner.*